(12) United States Patent
Xue

(10) Patent No.: US 11,017,244 B2
(45) Date of Patent: May 25, 2021

(54) OBSTACLE TYPE RECOGNIZING METHOD AND APPARATUS, DEVICE AND STORAGE MEDIUM

(71) Applicant: BAIDU ONLINE NETWORK TECHNOLOGY (BEIJING) CO., LTD., Haidian District Beijing (CN)

(72) Inventor: Zhao Xue, Beijing (CN)

(73) Assignee: Baidu Online Network Technology (Beijing) Co., Ltd., Beijing (CN)

( * ) Notice: Subject to any disclaimer, the term of this patent is extended or adjusted under 35 U.S.C. 154(b) by 256 days.

(21) Appl. No.: 16/011,897

(22) Filed: Jun. 19, 2018

(65) Prior Publication Data

US 2018/0365504 A1     Dec. 20, 2018

(30) Foreign Application Priority Data

Jun. 20, 2017   (CN) .......................... 201710491721.0

(51) Int. Cl.
   *G06K 9/00*     (2006.01)
   *G06N 5/04*     (2006.01)
   (Continued)

(52) U.S. Cl.
   CPC ..... *G06K 9/00805* (2013.01); *G06K 9/00201* (2013.01); *G06K 9/6267* (2013.01);
   (Continued)

(58) Field of Classification Search
   CPC ............. G06K 9/00805; G06K 9/6267; G06K 9/00201; G06K 2209/23; G06N 3/0454;
   (Continued)

(56) References Cited

U.S. PATENT DOCUMENTS

| 7,979,172 B2 * | 7/2011 | Breed | G08G 1/161 |
| | | | 701/117 |
| 9,052,721 B1 * | 6/2015 | Dowdall | G05D 1/0272 |

(Continued)

FOREIGN PATENT DOCUMENTS

| CN | 104636725 A | 5/2015 |
| CN | 105957145 A | 9/2016 |

OTHER PUBLICATIONS

Chinese Office Action dated Mar. 30, 2021, for related Chinese Appln. No. 201710491721.0; 6 Pages.

(Continued)

*Primary Examiner* — Phuoc Tran
(74) *Attorney, Agent, or Firm* — Brooks Kushman PC

(57) ABSTRACT

The present disclosure provides an obstacle type recognizing method and apparatus, a device and a storage medium, wherein the method comprises: obtaining 3D point cloud data corresponding to a to-be-recognized obstacle; mapping the 3D point cloud data and its dimension data to a four-dimensional array; recognizing a type of the obstacle through a deep learning algorithm based on the four-dimensional array. The solution of the present disclosure can be applied to determine the type of the obstacle such as a person, a bicycle or a motor vehicle; and recognize a small-sized vehicle, a medium-sized vehicle and a large-sized vehicle; and improve the accuracy of a recognition result.

15 Claims, 4 Drawing Sheets

(51) Int. Cl.
*G06K 9/62* (2006.01)
*G06N 3/04* (2006.01)
*G06N 3/08* (2006.01)

(52) U.S. Cl.
CPC ........... *G06N 3/0454* (2013.01); *G06N 5/046* (2013.01); *G06K 2209/23* (2013.01); *G06N 3/08* (2013.01); *G06T 2207/10028* (2013.01); *G06T 2207/20084* (2013.01)

(58) Field of Classification Search
CPC ...................... G06N 5/046; G06N 3/08; G06T 2207/10028; G06T 2207/20084; G06T 7/70; G06T 2207/20081; G06T 2207/30252; G01S 7/4802; G01S 17/931
See application file for complete search history.

(56) References Cited

U.S. PATENT DOCUMENTS

| | | | |
|---|---|---|---|
| 9,383,753 B1* | 7/2016 | Templeton | G01S 17/86 |
| 10,026,017 B2* | 7/2018 | Luo | G06K 9/00624 |
| 2012/0281907 A1* | 11/2012 | Samples | G06K 9/00201 |
| | | | 382/159 |
| 2020/0034620 A1* | 1/2020 | Lutterodt | G01C 11/10 |

OTHER PUBLICATIONS

Chinese Search Report dated Mar. 18, 2021 for related Chinese Appln. No. 2017104917210; 2 Pages.

Three-bit Representation of Three-dimensional Range Data, by N. Karpinsky, Y. Wang and S. Zhang; Applied Optics, vol. 52, No. 11, Apr. 2013; pp. 2286-2293.

* cited by examiner

OBSTACLE TYPE RECOGNIZING METHOD AND APPARATUS, DEVICE AND STORAGE MEDIUM

The present application claims the priority of Chinese Patent Application No. 2017104917210, filed on Jun. 20, 2017, with the title of "Obstacle type recognizing method and apparatus, device and storage medium". The disclosure of the above applications is incorporated herein by reference in its entirety.

FIELD OF THE DISCLOSURE

The present disclosure relates to computer application technologies, and particularly to an obstacle type recognizing method and apparatus, a device and a storage medium.

BACKGROUND OF THE DISCLOSURE

A driverless vehicle, also called an autonomous vehicle, means that the vehicle's surrounding is sensed by various sensors, and the vehicle's steering and speed are controlled according to road, vehicle position and obstacle information obtained from the sensing so that the vehicle can travel safely and reliably on the road.

According to an obstacle detection technology through 3D sensing used by the driverless vehicle, a laser radar is used to obtain 3D distance information of the environment around the vehicle, the laser radar scans the surrounding scenario and returns point cloud data of the scenario 3D space, namely, 3D point cloud data. The environment-sensing obstacle detection technology of the vehicle-mounted laser radar enables direct acquisition of 3D distance shape information of an object and has advantages such as a high measurement precision and insensitivity to changes of an illumination environment.

It is feasible to perform obstacle detection and obstacle type recognition and output obstacle information based on 3D point cloud data obtained from scanning and by sensing the travel environment through a distance analyzing and recognizing technology. The recognition includes recognition of vehicles, pedestrians, and other various mobile or stationary objects on the ground that might affect passage and safety of vehicles so that the driverless vehicle performs avoidance operations.

To enable the vehicle to travel on the road safely and reliably, it is necessary to, during travel, recognize objects around a travel path that might impose potential safety hazard to travel safety in a real-time and accurate manner, and perform necessary operations for the vehicle itself to avoid occurrence of a traffic accident.

In the prior art, due to factors such as high costs of a laser radar, the current environment-sensing technical solution are most based on 2D vision, research of 3D sensing technology based on the laser radar is insufficient, there is not yet a mature implementation mode, and the recognition result has a lower accuracy; furthermore, although pedestrians, small vehicles and large vehicles can be recognized, an effect of recognizing medium-sized vehicles and large-sized vehicles is undesirable.

SUMMARY OF THE DISCLOSURE

A plurality of aspects of the present disclosure provide an obstacle type recognizing method and apparatus, a device and a storage medium, which can improve accuracy of a recognition result.

According to an aspect of the present disclosure, there is provided an obstacle type recognizing method, comprising:
obtaining 3D point cloud data corresponding to a to-be-recognized obstacle; mapping the 3D point cloud data and its dimension data to a four-dimensional array;
recognizing a type of the obstacle through a deep learning algorithm based on the four-dimensional array.

The above aspect and any possible implementation mode further provide an implementation mode: the method further comprises:
obtaining each obstacle detected from the 3D point cloud data obtained by scanning;
considering each detected obstacle as the to-be-recognized obstacle;
wherein the 3D point cloud data is obtained by scanning an environment around a driverless vehicle.

The above aspect and any possible implementation mode further provide an implementation mode: the four-dimensional array is stored in a database in a C*H*W array format, wherein C=4 and includes an R channel, a G channel and a B channel and a dimension feature channel.

The above aspect and any possible implementation mode further provide an implementation mode: the mapping the 3D point cloud data and its dimension data to the four-dimensional array comprises:
mapping the 3D point cloud data from a first view angle to an R channel of the four-dimensional array;
mapping the 3D point cloud data from a second view angle to a G channel of the four-dimensional array,
mapping the 3D point cloud data from a third view angle to a B channel of the four-dimensional array;
mapping the dimension data of the 3D point cloud data to the dimension feature channel of the four-dimensional array;
generating the four-dimensional array according to mapping results.

The above aspect and any possible implementation mode further provide an implementation mode: the first view angle is one of the following: a top view angle, a vehicle head front view angle, and a left view angle;
the second view angle may be one of the following: a top view angle, a vehicle head front view angle, and a left view angle;
the third view angle may be one of the following: a top view angle, a vehicle head front view angle, and a left view angle;
the first view angle, the second view angle and the third view angle are different view angles.

The above aspect and any possible implementation mode further provide an implementation mode: the dimension data of the 3D point cloud data are values of length, width, height and volume after normalization.

The above aspect and any possible implementation mode further provide an implementation mode: the mapping the dimension data of the 3D point cloud data to the dimension feature channel of the four-dimensional array further comprises:
respectively mapping values of length, width, height and volume after normalization to different geometrical shapes of the dimension feature channel.

According to another aspect of the present disclosure, there is provided an obstacle type recognizing apparatus, comprising: an obtaining unit, a mapping unit and a classifying unit;
the obtaining unit is configured to obtain 3D point cloud data corresponding to a to-be-recognized obstacle, and send the 3D point cloud data to the mapping unit;

the mapping unit is configured to map the 3D point cloud data and its dimension data to a four-dimensional array, and send the four-dimensional array to the classifying unit;

the classifying unit is configured to recognize a type of the obstacle through a deep learning algorithm based on the four-dimensional array.

The above aspect and any possible implementation mode further provide an implementation mode: upon obtaining the 3D point cloud data corresponding to the to-be-recognized obstacle, the obtaining unit specifically executes:

obtaining each obstacle detected from the 3D point cloud data obtained by scanning;

considering each detected obstacle as the to-be-recognized obstacle;

wherein the 3D point cloud data is obtained by scanning an environment around a driverless vehicle.

The above aspect and any possible implementation mode further provide an implementation mode: the four-dimensional array is stored in a database in a C*H*W array format, wherein C=4 and includes an R channel, a G channel and a B channel and a dimension feature channel.

The above aspect and any possible implementation mode further provide an implementation mode: upon mapping the 3D point cloud data and its dimension data to the four-dimensional array, the mapping unit specifically executes: mapping the 3D point cloud data from a first view angle to an R channel of the four-dimensional array, mapping the 3D point cloud data from a second view angle to a G channel of the four-dimensional array, mapping the 3D point cloud data from a third view angle to a B channel of the four-dimensional array, and mapping the dimension data of the 3D point cloud data to the dimension feature channel of the four-dimensional array; generating the four-dimensional array according to mapping results.

The above aspect and any possible implementation mode further provide an implementation mode: the first view angle is one of the following: a top view angle, a vehicle head front view angle, and a left view angle;

the second view angle may be one of the following: a top view angle, a vehicle head front view angle, and a left view angle;

the third view angle may be one of the following: a top view angle, a vehicle head front view angle, and a left view angle;

the first view angle, the second view angle and the third view angle are different view angles.

The above aspect and any possible implementation mode further provide an implementation mode: the dimension data of the 3D point cloud data are values of length, width, height and volume after normalization.

The above aspect and any possible implementation mode further provide an implementation mode: upon mapping the dimension data of the 3D point cloud data to the dimension feature channel of the four-dimensional array, the mapping unit specifically executes: further comprising respectively mapping values of length, width, height and volume after normalization to different geometrical shapes of the dimension feature channel.

According to a further aspect of the present disclosure, there is provided a computer device, comprising a memory, a processor and a computer program which is stored on the memory and runs on the processor, the processor, upon executing the program, implementing the above-mentioned method.

According to a further aspect of the present disclosure, there is provided a computer-readable storage medium on which a computer program is stored, the program, when executed by a processor, implementing the aforesaid method.

As can be seen from the above introduction, according to embodiments of the present disclosure, first the 3D point cloud data corresponding to the to-be-recognized obstacle and its dimension data are mapped to the four-dimensional array, and then the type of the obstacle is recognized through the deep learning algorithm based on the four-dimensional array. The deep learning algorithm is a very mature algorithm and thereby ensures the accuracy of the recognition result, i.e., improves the accuracy of the recognition result; the type of the obstacle such as a person, a bicycle or a motor vehicle may be determined; furthermore, a small-sized vehicle, a medium-sized vehicle and a large-sized vehicle may be recognized through the learning of the dimension data.

DETAILED DESCRIPTION OF PREFERRED EMBODIMENTS

To make objectives, technical solutions and advantages of embodiments of the present disclosure clearer, technical solutions of embodiment of the present disclosure will be described clearly and completely with reference to figures in embodiments of the present disclosure. Obviously, embodiments described here are partial embodiments of the present disclosure, not all embodiments. All other embodiments acquired by those having ordinary skill in the art based on the embodiments of the present disclosure, without making any inventive efforts, fall within the protection scope of the present disclosure.

In addition, the term "and/or" used in the text is only an association relationship depicting associated objects and represents that three relations might exist, for example, A and/or B may represents three cases, namely, A exists individually, both A and B coexist, and B exists individually. In addition, the symbol "/" in the text generally indicates associated objects before and after the symbol are in an "or" relationship.

Figure 1:
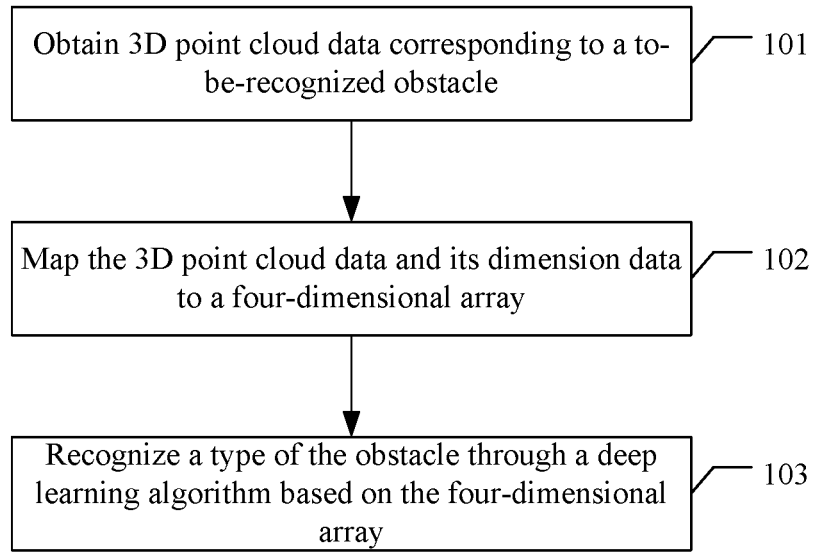
FIG. 1 is a flow chart of an embodiment of an obstacle type recognizing method according to the present disclosure.

FIG. 1 is a flow chart of an embodiment of an obstacle type recognizing method according to the present disclosure. As shown in FIG. 1, the method comprises the following step:

In 101, environment around the driverless vehicle is scanned to obtain 3D point cloud data.

Before this step, it is feasible to first obtain each obstacle detected from 3D point cloud data obtained by scanning, consider each detected obstacle as a to-be-recognized obstacle, and then recognize the type of said each detected obstacle in the manner stated in the present disclosure.

How to specifically detect the 3D point cloud data obtained by scanning to obtain obstacles may depend on actual needs, for example, a clustering algorithm may be employed.

Clustering means dividing a data set into different classes or clusters according to a specific standard so that similarity between data in a class or cluster is as large as possible.

Common clustering algorithms may be classified into the following classes: a division method, a hierarchical method, a density-based method, a network-based method, a model-based method and the like.

Regarding the three-dimensional point cloud data obtained by scanning, it is possible to detect them to obtain zero obstacle, one obstacle or multiple obstacles.

Regarding each obstacle, it corresponding 3D point cloud data can be determined according to the prior art; regarding each obstacle, its corresponding 3D point cloud data is part of the 3D point cloud data obtained by scanning.

In 102, the obtained 3D point cloud data is mapped to four-dimensional array.

Preferably, the four-dimensional array obtained by mapping is stored in a database in a C*H*W array format, wherein C=4 and includes an R channel, a G channel and a B channel and a dimension feature channel; H is height, and W is width.

A specific mapping manner may be:

mapping the 3D point cloud data from a first view angle to an R channel of the four-dimensional array;

mapping the 3D point cloud data from a second view angle to a G channel of the four-dimensional array;

mapping the 3D point cloud data from a third view angle to a B channel of the four-dimensional array;

mapping the dimension data of the 3D point cloud data to the dimension feature channel of the four-dimensional array;

generating the four-dimensional array according to mapping results.

Wherein the first view angle may be one of the following: a top view angle, a vehicle head front view angle, and a left view angle;

the second view angle may be one of the following: a top view angle, a vehicle head front view angle, and a left view angle;

the third view angle may be one of the following: a top view angle, a vehicle head front view angle, and a left view angle;

the first view angle, the second view angle and the third view angle are different view angles.

For example, the first view angle may be a top view angle, the second view angle may be a vehicle head front view angle, and the third view angle may be a left view angle.

Correspondingly, it is feasible to map the 3D point cloud data from the top view angle to the R channel of the four-dimensional array, map the 3D point cloud data from the vehicle head front view angle to the G channel of the four-dimensional array, and map the 3D point cloud data from the left view angle to the B channel of the four-dimensional array.

Figure 2:
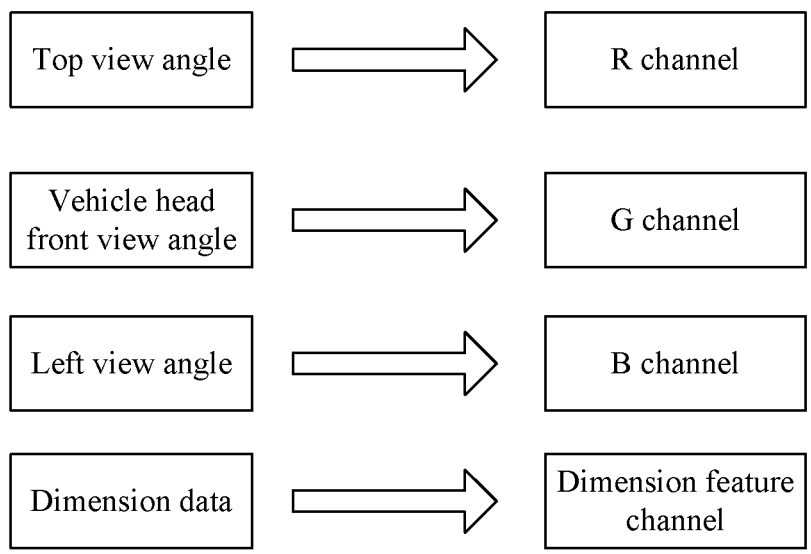
FIG. 2 is a schematic diagram showing corresponding relationship between the 3D point cloud data and their dimension data and different channels according to the present disclosure.

Therefore, corresponding relationship between the view angles and the RGB channels shown in FIG. 2 can be obtained. FIG. 2 is a schematic diagram showing corresponding relationship between different view angles and different RGB channels according to the present disclosure.

As shown in FIG. 2, the top view angle corresponds to the R channel, the vehicle head front view angle corresponds to the G channel, and the left view angle corresponds to the B channel.

Certainly, the above corresponding relationship is only for exemplary illustration. What specific corresponding relationship is employed may depend on actual needs.

How to specifically map also may depend on actual needs. For example, take the top view angle as an example, and the following mapping manner may be employed.

As for a point in a 3D space, it is assumed that its coordinate position is (10, 20, 30), wherein 10 is an x-direction coordinate, 20 is a y-direction coordinate, and 30 is a z-direction coordinate.

When mapping is performed from the top view angle, the z-direction coordinate may be set as 0, and then x-direction coordinate and y-direction coordinate may be used to calibrate a coordinate position (10, 20) of a two-dimensional space, which corresponds to a pixel point with the coordinate position (10, 20) in the four-dimensional array. A value of the pixel point on the R channel may be set as 255 and indicates the brightest color. A range of the value of each element in the RGB channels is 0•255.

Regarding each pixel point of the RGB channels on the four-dimensional array, if there is a corresponding point in the 3D space, a value of its corresponding channel may be set as 255; if there does not exist a corresponding point in the 3D space, a value of its corresponding channel may be set as 0.

It is feasible to, in the above manner, obtain a value of each point of the 3D point cloud corresponding to the obstacle in the 3D space on the R channel.

It is feasible to, in a manner similar to the above, obtain a value of each point of the 3D point cloud corresponding to the obstacle in the 3D space on the G channel, and obtain a value of each point of the 3D point cloud corresponding to the obstacle in the 3D space on the B channel.

It needs to be appreciated that in the 3D space, the x-direction coordinate and y-direction coordinate might be a negative value. In this case, a translation operation needs to be performed when mapping is performed. A specific implementation is of the prior art.

The dimension data of the 3D point cloud data may be a value obtained by normalizing length, width, height and volume.

How to specifically perform normalization may depend on actual needs. The following normalization manner may be employed.

A benchmark is set for the length, width, height and volume of the obstacle. Considering a maximum length of a larger obstacle such as a bus is 18 meters, a length benchmark LB is set as 18 meters, and a width benchmark WB is set as four meters; since a height of a motor vehicle is limited, a height benchmark HB is set as five meters; a volume benchmark VB is set as LB*WB*HB=360.

In the dimension feature channel, a range of value of each element is 0•255. Regarding an obtained 10*3*4 obstacle cloud, normalization is performed according to the length, width, height and volume benchmarks of the obstacle, a normalization result of the length 10 is 10/18*255=141.67, and rounded up as 142, the width is normalized as 3/4*255=192, the height is normalized as 4/5*255=204, and the volume is normalized as 10*3*4/360*255=85.

Figure 3:
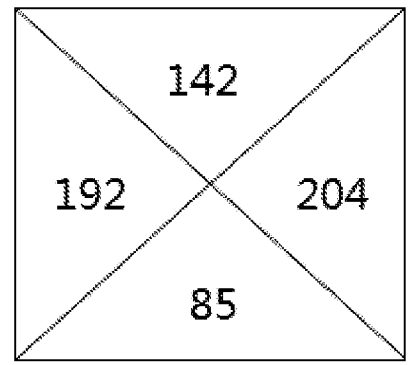
FIG. 3 is a schematic diagram of length, width, height and volume values mapped to a dimension feature channel according to the present disclosure.

Mapping the values of length, width, height and volume after normalization to different geometrical shapes of the dimension feature channel may also depend on actual needs, for example, as shown in FIG. 3. The dimension feature channel is divided into four geometrical shapes, each geometrical shape corresponds one of length, width, height and volume, and a value of each pixel of each geometrical shape is a normalized value of a corresponding one of the length, width, height and volume.

Since the values of each pixel point on the R channel, G channel and B channel and values of the length, width, height and volume of the obstacle on the dimension feature channel are obtained respectively, a four-dimensional array may be obtained.

The four-dimensional array is stored in a database such as LMDB or LEVELDB as input of a deep learning neural network.

In 103, based on the four-dimensional array, the type of the obstacle is recognized through a deep learning algorithm.

After the four-dimensional array is obtained, the type of the obstacle may be recognized based on the four-dimensional array.

Preferably, the deep learning algorithm may be employed to recognized the type of the obstacle. A specific deep learning algorithm may be determined according to actual needs, for example, a Convolution Neural Network (CNN) algorithm which is used extensively may be employed.

The convolution neural network is a multi-layer neural network and good at handling machine learning problems about images particularly large images. The convolution neural network, through a series of methods, successfully constantly reduces dimensionality of image recognition problems of massive data, and finally it can be trained. A typical convolution neural network may be comprised of a convolution layer, a pooling layer and a full connection layer, wherein the convolution layer cooperates with the pooling layer to form a plurality of convolution groups, features are extracted layer by layer, and finally classification is completed through several full connection layers. To conclude, the convolution neural network simulates feature differentiation through the convolution, reduces the order of magnitude of network parameters through weight sharing and pooling of convolution, and finally completes a task such as classification through the conventional neural network.

In the present disclosure, the obtained four-dimensional array have four channels, and the features of each view angle and dimension may be sufficiently learned through the deep learning algorithm such as the convolution neural network, thereby ensuring accuracy of the recognition result.

The type of the obstacle is marked and sent to a server so that a training sample may be generated on the server based on the four-dimensional array in the database such as LMDB or LEVELDB and the marking of the obstacle object. The training sample may be used to train the convolution neural network which considers the four-dimensional array as input and recognizes the type of the obstacle, thereby obtaining a machine learning model.

The trained machine learning model performs recognition for the four-dimensional array to determine the type of the obstacle such as a person, bicycle or a motor vehicle; furthermore, a small-sized vehicle, a medium-sized vehicle and a large-sized vehicle may be recognized.

Figure 4:
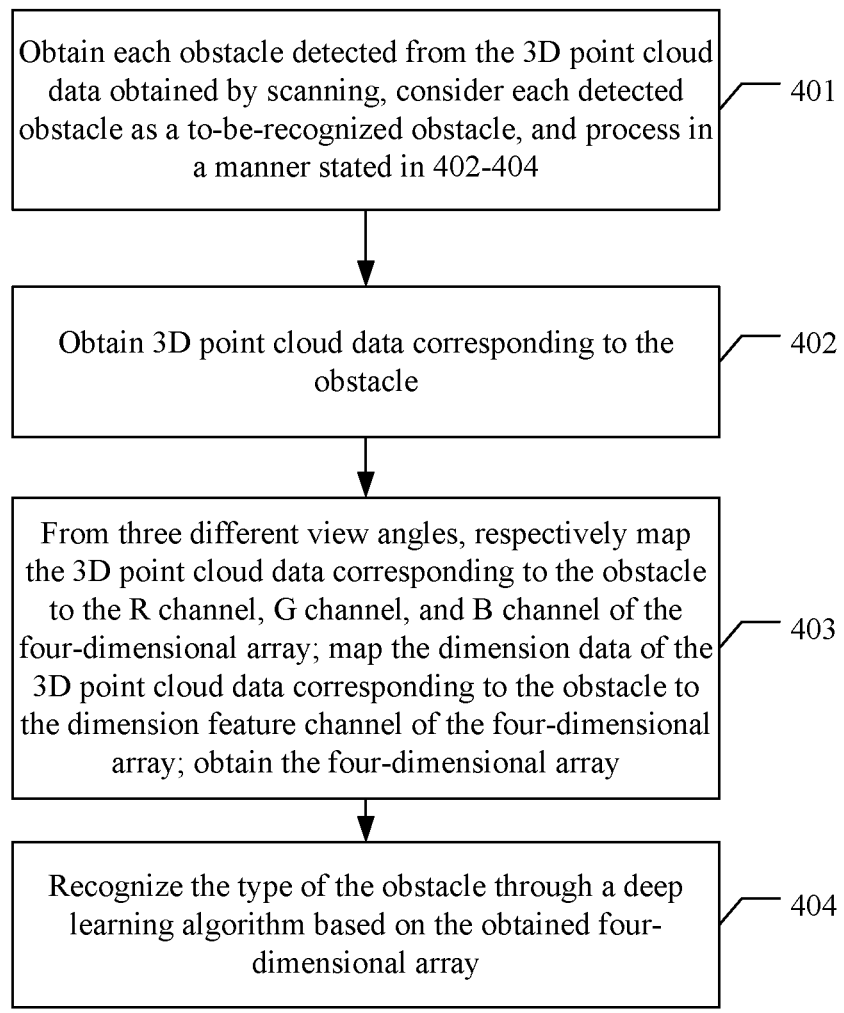
FIG. 4 is a flow chart of a preferred embodiment of an obstacle type recognizing method according to the present disclosure.

Based on the above introduction, FIG. 4 is a flow chart of a preferred embodiment of an obstacle type recognizing method according to the present disclosure. As shown in FIG. 4, the embodiment comprises the following specific implementation mode.

In 401, each obstacle detected from the 3D point cloud data obtained by scanning is obtained, and each detected obstacle is considered as a to-be-recognized obstacle, and processed in a manner as stated in 402-404.

Regarding a driverless vehicle, a laser radar is an important sensor of the driverless vehicle for sensing the 3D environment, and the laser radar scans the surrounding scenario and returns point cloud data of the scenario 3D space, namely, 3D point cloud data.

After the 3D point cloud data is obtained, it is possible to first detect the obstacle according to the 3D point cloud data, namely, detect to obtain the obstacles existing in the scenario around the driverless vehicle, and mark each obstacle in a predetermined manner.

Then, it is further possible to recognize the type of each detected obstacle, and correspondingly consider each detected obstacle as a to-be-recognized obstacle, and perform processing in the manner as shown in 402-404.

In 402, 3D point cloud data corresponding to the obstacle is obtained.

The 3D point cloud data forming the obstacle may be obtained.

In 403, from three different view angles, respectively map the 3D point cloud data corresponding to the obstacle to the R channel, G channel, and B channel of the four-dimensional array; map the dimension data of the 3D point cloud data corresponding to the obstacle to the dimension feature channel of the four-dimensional array; obtain the four-dimensional array.

The three different view angles may be a top view angle, a vehicle head front angle and a left view angle respectively.

The corresponding relationship between the view angle and the channel may depend on actual needs. For example, as shown in FIG. 2, the top view angle may correspond to the R channel, the vehicle head front view may correspond to the G channel, and the left view angle may correspond to the B channel.

The dimension data of the 3D point cloud data corresponding to the obstacle may be values of its length, width, height and volume after normalization, and the values of the length, width, height and volume after normalization are mapped to different geometrical shapes of the dimension feature channel. How to specifically perform mapping may depend on actual needs, for example as shown in FIG. 3.

In 404, the type of the obstacle may be recognized through the deep learning algorithm based on the obtained four-dimensional array.

The deep learning algorithm may be a convolution neural network algorithm.

The four-dimensional array is recognized to determine the type of the obstacle such as a person, bicycle or a motor vehicle; furthermore, a small-sized vehicle, a medium-sized vehicle and a large-sized vehicle may be recognized.

As can be seen from the above introduction, in the manner as stated in above embodiment, the to-be-recognized obstacle is converted from the 3D space to the 2D space, the four-dimensional array is obtained, and the type of the obstacle is recognized through the deep learning algorithm based on the four-dimensional array. In the field of recognition of the four-dimensional array, the deep learning algorithm is a very mature algorithm and thereby ensures the accuracy of the recognition result.

The above introduces the method embodiments. The solution of the present disclosure will be further described through an apparatus embodiment.

Figure 5:
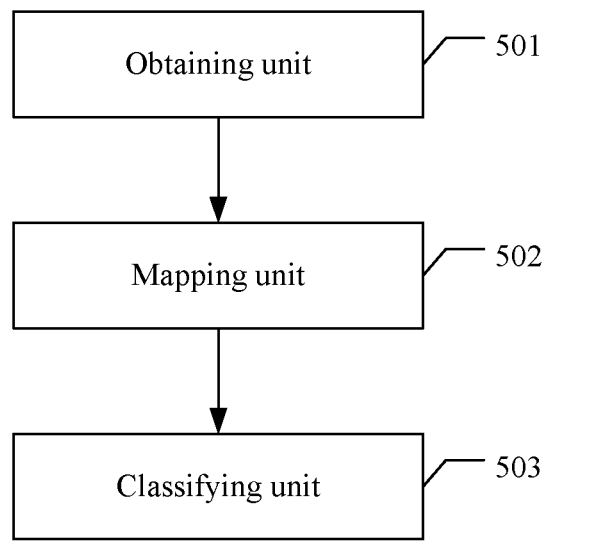
FIG. 5 is a structural diagram of components of an obstacle type recognizing apparatus according to the present disclosure.

FIG. 5 is a structural diagram of components of an obstacle type recognizing apparatus according to the present disclosure. As shown in FIG. 5, the apparatus comprises an obtaining unit 501, a mapping unit 502 and a classifying unit 503.

The obtaining unit 501 is configured to obtain 3D point cloud data corresponding to a to-be-recognized obstacle, and send the 3D point cloud data to the mapping unit 502.

The mapping unit 502 is configured to map the 3D point cloud data and its dimension data to a four-dimensional array, and send the four-dimensional array to the classifying unit 503.

The classifying unit 503 is configured to recognize the type of the obstacle through the deep learning algorithm based on the four-dimensional array.

The obtaining unit 501 may obtain each obstacle detected from the 3D point cloud data obtained by scanning, and consider each detected obstacle as a to-be-recognized obstacle.

The 3D point cloud data may be obtained by scanning the environment around the driverless vehicle.

Regarding the three-dimensional point cloud data obtained by scanning, it is possible to detect them to obtain zero obstacle, one obstacle or multiple obstacles.

Regarding each obstacle, its corresponding 3D point cloud data can be determined according to the prior art; regarding each obstacle, its corresponding 3D point cloud data is part of the 3D point cloud data obtained by scanning.

Regarding each detected obstacle, the obtaining unit 501 may further obtain the 3D point cloud data corresponding to the obstacle and send the 3D point cloud data to the mapping unit 502.

Correspondingly, the mapping unit 502 may map the 3D point cloud data and its dimension data to the four-dimensional array, and convert the 3D space to the 2D space.

Preferably, the four-dimensional array obtained by mapping is stored in a database in a C*H*W array format, wherein C=4 and includes an R channel, a G channel and a B channel and a dimension feature channel.

Specifically, the mapping unit 502 may employ the following mapping manners: mapping the 3D point cloud data from a first view angle to an R channel of the four-dimensional array;

mapping the 3D point cloud data from a second view angle to a G channel of the four-dimensional array;

mapping the 3D point cloud data from a third view angle to a B channel of the four-dimensional array;

mapping the dimension data of the 3D point cloud data to the dimension feature channel of the four-dimensional array;

generating the four-dimensional array according to mapping results.

Wherein the first view angle may be one of the following: a top view angle, a vehicle head front view angle, and a left view angle;

the second view angle may be one of the following: a top view angle, a vehicle head front view angle, and a left view angle;

the third view angle may be one of the following: a top view angle, a vehicle head front view angle, and a left view angle;

the first view angle, the second view angle and the third view angle are different view angles.

For example, the first view angle may be a top view angle, the second view angle may be a vehicle head front view angle, and the third view angle may be a left view angle.

Correspondingly, the mapping unit 502 may map the 3D point cloud data from the top view angle to the R channel of the four-dimensional array, map the 3D point cloud data from the vehicle head front view angle to the G channel of the four-dimensional array, and map the 3D point cloud data from the left view angle to the B channel of the four-dimensional array; map values of length, width, height and volume of the 3D point cloud data after normalization to different geometrical shapes of the dimension feature channel.

After the four-dimensional array is obtained, the classifying unit 503 may recognize the type of the obstacle through a deep learning algorithm based on the four-dimensional array.

Preferably, the deep learning algorithm may be a convolution neural network algorithm.

The obtained four-dimensional array have four channels, and the features of each view angle and dimension may be sufficiently learned through the deep learning algorithm such as the convolution neural network, thereby ensuring accuracy of the recognition result.

The four-dimensional array is recognized to determine the type of the obstacle such as a person, bicycle or a motor vehicle; furthermore, a small-sized vehicle, a medium-sized vehicle and a large-sized vehicle may be recognized.

Reference may be made to corresponding depictions in the aforesaid method embodiment for a specific workflow of the apparatus embodiment shown in FIG. 5. The workflow is not detailed any more.

As can be seen from the above introduction, in the manner as stated in above embodiment, the to-be-recognized obstacle is converted from the 3D space to the 2D space, the four-dimensional array is obtained, and the type of the obstacle is recognized through the deep learning algorithm based on the four-dimensional array. The deep learning algorithm is a very mature algorithm and thereby ensures the accuracy of the recognition result.

Figure 6:
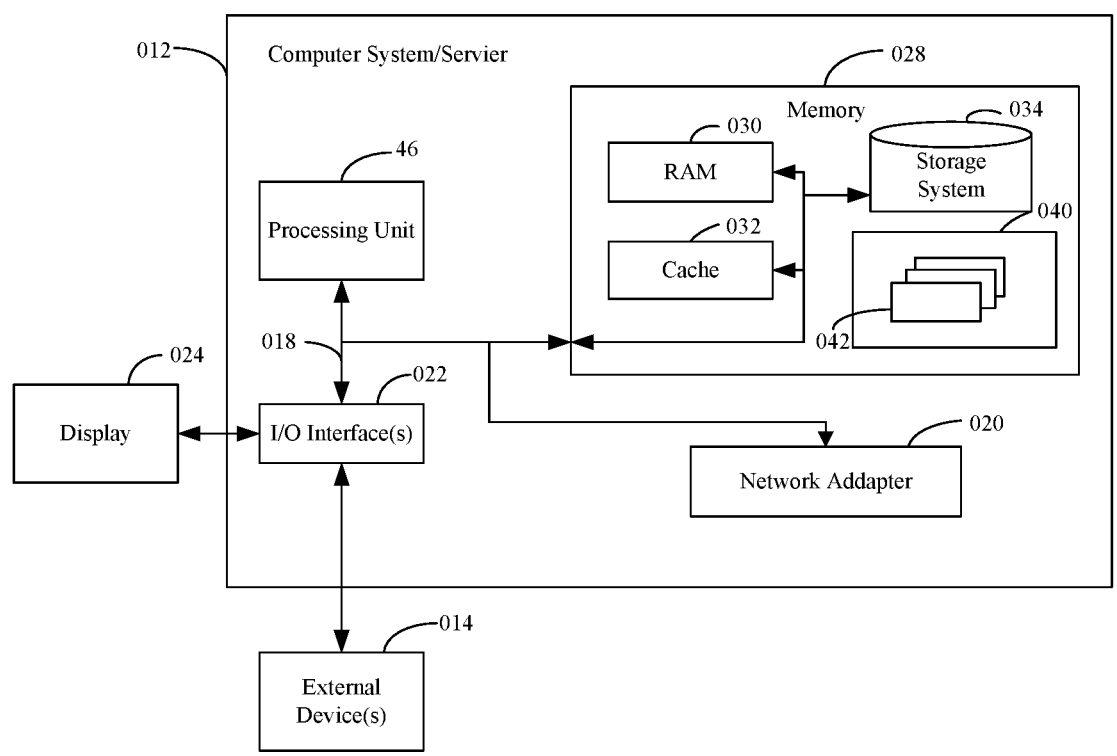
FIG. 6 illustrates a block diagram of an example computer system/server 012 adapted to implement an implementation mode of the present disclosure.

FIG. 6 illustrates a block diagram of an example computer system/server 012 adapted to implement an implementation mode of the present disclosure. The computer system/server 012 shown in FIG. 6 is only an example and should not bring about any limitation to the function and scope of use of the embodiments of the present disclosure.

As shown in FIG. 6, the computer system/server 012 is shown in the form of a general-purpose computing device. The components of computer system/server 012 may include, but are not limited to, one or more processors or processing units 016, a memory 028, and a bus 018 that couples various system components including system memory 028 and the processor 016.

Bus 018 represents one or more of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computer system/server 012 typically includes a variety of computer system readable media. Such media may be any available media that is accessible by computer system/server 012, and it includes both volatile and non-volatile media, removable and non-removable media.

Memory 028 can include computer system readable media in the form of volatile memory, such as random access memory (RAM) 030 and/or cache memory 032. Computer system/server 012 may further include other removable/non-removable, volatile/non-volatile computer system storage media. By way of example only, storage system 034 can be provided for reading from and writing to a non-removable, non-volatile magnetic media (not shown in FIG. 6 and typically called a "hard drive"). Although not shown in FIG. 6, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each drive can be connected to bus 018 by one or more data media interfaces. The memory 028 may include at least one program product having a set (e.g., at least one) of program modules that are configured to carry out the functions of embodiments of the present disclosure.

Program/utility 040, having a set (at least one) of program modules 042, may be stored in the system memory 028 by way of example, and not limitation, as well as an operating system, one or more disclosure programs, other program modules, and program data. Each of these examples or a certain combination thereof might include an implementation of a networking environment. Program modules 042 generally carry out the functions and/or methodologies of embodiments of the present disclosure.

Computer system/server 012 may also communicate with one or more external devices 014 such as a keyboard, a pointing device, a display 024, etc.; with one or more devices that enable a user to interact with computer system/server 012; and/or with any devices (e.g., network card, modem, etc.) that enable computer system/server 012 to communicate with one or more other computing devices. Such communication can occur via Input/Output (I/O) interfaces 022. Still yet, computer system/server 012 can communicate with one or more networks such as a local area network (LAN), a general wide area network (WAN), and/or a public network (e.g., the Internet) via network adapter 020. As depicted in FIG. 6, network adapter 020 communicates with the other communication modules of computer system/server 012 via bus 018. It should be understood that although not shown, other hardware and/or software modules could be used in conjunction with computer system/server 012. Examples, include, but are not limited to: microcode, device drivers, redundant processing units, external disk drive arrays, RAID systems, tape drives, and data archival storage systems, etc.

The processing unit 016 executes functions and/or methods in the embodiments described in the present disclosure by running programs stored in the memory 028. The above computer program may be stored in a computer storage medium, i.e., the computer storage medium is encoded with a computer program. The program, when executed by one or more computers, enables one or more computers to execute steps of the method and/or operations of the apparatus shown in the above embodiments of the present disclosure.

As time goes by and technologies develop, the meaning of medium is increasingly broad. A propagation channel of the computer program is no longer limited to tangible medium, and it may also be directly downloaded from the network. The computer-readable medium of the present embodiment may employ any combinations of one or more computer-readable media. The machine readable medium may be a machine readable signal medium or a machine readable storage medium. A machine readable medium may include, but not limited to, an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the text herein, the computer readable storage medium can be any tangible medium that include or store programs for use by an instruction execution system, apparatus or device or a combination thereof.

The computer-readable signal medium may be included in a baseband or serve as a data signal propagated by part of a carrier, and it carries a computer-readable program code therein. Such propagated data signal may take many forms, including, but not limited to, electromagnetic signal, optical signal or any suitable combinations thereof. The computer-readable signal medium may further be any computer-readable medium besides the computer-readable storage medium, and the computer-readable medium may send, propagate or transmit a program for use by an instruction execution system, apparatus or device or a combination thereof.

The program codes included by the computer-readable medium may be transmitted with any suitable medium, including, but not limited to radio, electric wire, optical cable, RF or the like, or any suitable combination thereof.

Computer program code for carrying out operations disclosed herein may be written in one or more programming languages or any combination thereof. These programming languages include an object oriented programming language such as Java, Smalltalk, C++ or the like, and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Those skilled in the art can clearly understand that for purpose of convenience and brevity of depictions, reference may be made to corresponding procedures in the aforesaid method embodiments for specific operation procedures of the system, apparatus and units described above, which will not be detailed any more.

In the embodiments provided by the present disclosure, it should be understood that the revealed method and apparatus can be implemented through other ways. For example, the above-described embodiments for the apparatus are only exemplary, e.g., the division of the units is merely logical one, and, in reality, they can be divided in other ways upon implementation. For example, a plurality of units or components may be combined or integrated into another system, or some features may be neglected or not executed. In addition, mutual coupling or direct coupling or communication connection as displayed or discussed may be performed via some interfaces, and indirect coupling or communication connection of means or units may be electrical, mechanical or in other forms.

The units described as separate parts may be or may not be physically separated, the parts shown as units may be or may not be physical units, i.e., they can be located in one place, or distributed in a plurality of network units. One can select some or all the units to achieve the purpose of the embodiment according to the actual needs.

Further, in the embodiments of the present disclosure, functional units can be integrated in one processing unit, or they can be separate physical presences; or two or more units can be integrated in one unit. The integrated unit described above can be realized in the form of hardware, or they can be realized with hardware and software functional units.

Finally, it is appreciated that the above embodiments are only used to illustrate the technical solutions of the present disclosure, not to limit the present disclosure; although the present disclosure is described in detail with reference to the above embodiments, those having ordinary skill in the art should understand that they still can modify technical solutions recited in the aforesaid embodiments or equivalently replace partial technical features therein; these modifications or substitutions do not make essence of corresponding technical solutions depart from the spirit and scope of technical solutions of embodiments of the present disclosure.

What is claimed is:

1. An obstacle type recognizing method, wherein the method comprises:
    obtaining 3D point cloud data corresponding to a to-be-recognized obstacle;
    mapping the 3D point cloud data and its dimension data to a four-dimensional array;
    recognizing a type of the obstacle through a deep learning algorithm based on the four-dimensional array,
    wherein the four-dimensional array is stored in a database in a C*H*W array format, wherein C=4 and includes an R channel, a G channel and a B channel and a dimension feature channel, and
    wherein the mapping the 3D point cloud data and its dimension data to the four-dimensional array comprises:
    mapping the 3D point cloud data from a first view angle to an R channel of the four-dimensional array;
    mapping the 3D point cloud data from a second view angle to a G channel of the four-dimensional array,
    mapping the 3D point cloud data from a third view angle to a B channel of the four-dimensional array;
    mapping the dimension data of the 3D point cloud data to the dimension feature channel of the four-dimensional array; and
    generating the four-dimensional array according to mapping results.

2. The method according to claim 1, wherein
    the method further comprises:
    obtaining each obstacle detected from the 3D point cloud data obtained by scanning;
    considering each detected obstacle as the to-be-recognized obstacle;
    wherein the 3D point cloud data is obtained by scanning an environment around a driverless vehicle.

3. The method according to claim 1, wherein
    the first view angle is one of the following: a top view angle, a vehicle head front view angle, and a left view angle;
    the second view angle is one of the following: a top view angle, a vehicle head front view angle, and a left view angle;
    the third view angle is one of the following: a top view angle, a vehicle head front view angle, and a left view angle;
    the first view angle, the second view angle and the third view angle are different view angles.

4. The method according to claim 1, wherein
    the dimension data of the 3D point cloud data are values of length, width, height and volume after normalization.

5. The method according to claim 4, wherein the mapping the dimension data of the 3D point cloud data to the dimension feature channel of the four-dimensional array further comprises:
    respectively mapping values of length, width, height and volume after normalization to different geometrical shapes of the dimension feature channel.

6. A computer device, comprising a memory, a processor and a computer program which is stored on the memory and runs on the processor, wherein the processor, upon executing the program, implements the following operation:
    obtaining 3D point cloud data corresponding to a to-be-recognized obstacle;
    mapping the 3D point cloud data and its dimension data to a four-dimensional array;
    recognizing a type of the obstacle through a deep learning algorithm based on the four-dimensional array,
    wherein the four-dimensional array is stored in a database in a C*H*W array format, wherein C=4 and includes an R channel, a G channel and a B channel and a dimension feature channel, and
    wherein the mapping the 3D point cloud data and its dimension data to the four-dimensional array comprises:
    mapping the 3D point cloud data from a first view angle to an R channel of the four-dimensional array;
    mapping the 3D point cloud data from a second view angle to a G channel of the four-dimensional array,
    mapping the 3D point cloud data from a third view angle to a B channel of the four-dimensional array;
    mapping the dimension data of the 3D point cloud data to the dimension feature channel of the four-dimensional array; and
    generating the four-dimensional array according to mapping results.

7. The computer device according to claim 6, wherein
    the operation further comprises:
    obtaining each obstacle detected from the 3D point cloud data obtained by scanning;
    considering each detected obstacle as the to-be-recognized obstacle;
    wherein the 3D point cloud data is obtained by scanning an environment around a driverless vehicle.

8. The computer device according to claim 6, wherein
    the first view angle is one of the following: a top view angle, a vehicle head front view angle, and a left view angle;
    the second view angle is one of the following: a top view angle, a vehicle head front view angle, and a left view angle;
    the third view angle is one of the following: a top view angle, a vehicle head front view angle, and a left view angle;
    the first view angle, the second view angle and the third view angle are different view angles.

9. The computer device according to claim 6, wherein
    the dimension data of the 3D point cloud data are values of length, width, height and volume after normalization.

10. The computer device according to claim 9, wherein the mapping the dimension data of the 3D point cloud data to the dimension feature channel of the four-dimensional array further comprises:

respectively mapping values of length, width, height and volume after normalization to different geometrical shapes of the dimension feature channel.

11. A non-transitory computer-readable storage medium on which a computer program is stored, wherein the program, when executed by a processor, implements the following operation:
obtaining 3D point cloud data corresponding to a to-be-recognized obstacle;
mapping the 3D point cloud data and its dimension data to a four-dimensional array;
recognizing a type of the obstacle through a deep learning algorithm based on the four-dimensional array,
wherein the four-dimensional array is stored in a database in a C*H*W array format, wherein C=4 and includes an R channel, a G channel and a B channel and a dimension feature channel, and
wherein the mapping the 3D point cloud data and its dimension data to the four-dimensional array comprises:
mapping the 3D point cloud data from a first view angle to an R channel of the four-dimensional array,
mapping the 3D point cloud data from a second view angle to a G channel of the four-dimensional array,
mapping the 3D point cloud data from a third view angle to a B channel of the four-dimensional array;
mapping the dimension data of the 3D point cloud data to the dimension feature channel of the four-dimensional array; and
generating the four-dimensional array according to mapping results.

12. The non-transitory computer-readable storage medium according to claim 11, wherein the operation further comprises:
obtaining each obstacle detected from the 3D point cloud data obtained by scanning;
considering each detected obstacle as the to-be-recognized obstacle;
wherein the 3D point cloud data is obtained by scanning an environment around a driverless vehicle.

13. The non-transitory computer-readable storage medium according to claim 11, wherein
the first view angle is one of the following: a top view angle, a vehicle head front view angle, and a left view angle;
the second view angle is one of the following: a top view angle, a vehicle head front view angle, and a left view angle;
the third view angle is one of the following: a top view angle, a vehicle head front view angle, and a left view angle;
the first view angle, the second view angle and the third view angle are different view angles.

14. The non-transitory computer-readable storage medium according to claim 11, wherein
the dimension data of the 3D point cloud data are values of length, width, height and volume after normalization.

15. The non-transitory computer-readable storage medium according to claim 14, wherein the mapping the dimension data of the 3D point cloud data to the dimension feature channel of the four-dimensional array further comprises:
respectively mapping values of length, width, height and volume after normalization to different geometrical shapes of the dimension feature channel.

* * * * *